United States Patent [19]

Lopez et al.

[11] Patent Number: 5,601,397

[45] Date of Patent: Feb. 11, 1997

[54] APPARATUS FOR COUNTING AND STACKING TORTILLAS

[75] Inventors: Manuel Lopez; Rafael Lopez, both of Chicago, Ill.

[73] Assignee: El Milagro, Inc., Chicago, Ill.

[21] Appl. No.: 180,097

[22] Filed: Jan. 11, 1994

[51] Int. Cl.[6] ............................................. B65G 57/08
[52] U.S. Cl. ..................... 414/790.7; 198/431; 198/604; 198/811; 271/186; 414/757
[58] Field of Search .......................... 271/186; 414/757, 414/790.7; 198/431, 604, 811

[56] References Cited

U.S. PATENT DOCUMENTS

| | | | |
|---|---|---|---|
| 2,379,117 | 6/1945 | Touton | 198/604 X |
| 3,357,701 | 12/1967 | Cremer | 271/186 X |
| 3,642,119 | 2/1972 | Warwick | 198/811 |
| 4,040,616 | 8/1977 | Clarkson et al. | 271/186 X |
| 4,526,362 | 7/1985 | Thierstein | 271/186 |
| 4,530,632 | 7/1985 | Sela . | |
| 4,604,851 | 8/1986 | Reist | 198/431 X |

FOREIGN PATENT DOCUMENTS

| | | | |
|---|---|---|---|
| 473043 | 7/1969 | Switzerland | 414/790.7 |
| 655614 | 4/1979 | U.S.S.R. | 198/811 |

*Primary Examiner*—Karen B. Merritt
*Assistant Examiner*—Janice L. Krizek
*Attorney, Agent, or Firm*—Laff, Whitesel, Conte & Saret, Ltd.

[57] ABSTRACT

An apparatus having a series of conveyor belts for flattening and stacking a plurality of flexible, generally planar articles, such as tortillas. The apparatus includes a first conveyor belt extending along first end, upper, second end and lower surfaces of a belt support. The conveyor belt is adapted to move the planar articles placed on the upper surface of the belt support from the first end to the second end. A second conveyor belt is biased against the first belt at the second end of the belt support for applying compressive and lateral forces to the planar articles as they are moved along the second end of the belt support. A third conveyor belt is located beneath the first and second conveyor belts for receiving the planar articles from the first belt, forming stacks of them, and then discharging the stacked planar articles. Motor assemblies drive the first, second, and third conveyor belts.

14 Claims, 3 Drawing Sheets ly planar products. More particularly, this invention relates
APPARATUS FOR COUNTING AND STACKING TORTILLAS

FIELD OF THE INVENTION

This invention relates to apparatuses for handling generally planar products. More particularly, this invention relates to apparatuses for counting, flattening, and stacking food products such as tortillas.

BACKGROUND OF THE INVENTION

Machines which automatically process food products are well known in the food industry. Such machines are invaluable in that they eliminate the cost of manual labor which is generally required for handling the food products during the manufacturing and pre-packaging processes. For example, food products, such as tortillas, typically are manually removed from an oven or discharged from a processing machine and then hand-counted and stacked for packaging. The labor cost incurred in manually counting and stacking tortillas substantially escalates the overall cost of tortillas. Thus, various machines have been introduced into the food industry for automatically counting and stacking tortillas or other similar food products, one of which is described in greater detail below.

U.S. Pat. No. 4,530,632 (hereinafter referred to as the '632 patent) discloses a machine wherein tortillas are placed on a first conveyor belt and moved down one end and along the underside of the belt. Contact between the tortillas and the belt is maintained by vacuum-creating air inlets formed in the belt. Flattening of the tortillas is accomplished by a flexible, stationary plate which is biased against the one end of the first conveyor belt. Specifically, as the tortillas are carried around the end of the belt, they pass between the biased plate and the conveyor belt. However, this bias often creates friction and/or promotes sticking between the moving tortillas and the stationary plate. Thus, it is standard industry practice to coat the stationary plate with Teflon paper to reduce friction and/or sticking between the moving tortillas and the plate.

After the tortillas have been flattened by the stationary plate, the tortillas are then dropped from the first conveyor belts onto a second or discharge conveyor belt positioned immediately beneath the first conveyor belt. The tortillas are stacked on top of each other and ultimately discharged by the second conveyor belt for packaging.

While the above-described machine, along with other article stacking, counting, and handling machines, may, in some instances, provide a means to more cost-effectively manufacture and otherwise process tortillas and other planar food products, they are often inadequate for reasons set forth below.

First, the known machines frequently have problems with inconsistent stacking of the tortillas attributable to numerous factors, including friction or sticking between the tortillas and the various machine components. For example, the Teflon-coated paper which covers the stationary plate of the '632 machine does not effectively eliminate friction or drag between the tortillas and the stationary plate during their contact. The presence of friction or drag, in turn, interferes with the precisely timed delivery of the tortillas to the discharge conveyor and results in inconsistent stacking.

Second, the above-described friction and sticking problems common to known machines often cause undesirable folding and breaking of tortillas which usually renders them unusable. Such folding and breaking problems are frequent occurrences in the Teflon-coated stationary plate of the '632 patent and are likewise not uncommon among the components of other machines.

Third, the known machines typically include problems with obstructions or blockages in machine components which often result from the previously described broken, torn, or folded tortillas. For example, breaks and tears in tortillas often ensue from friction generated between moving tortillas and the Teflon-coated stationary plate in the '632 machine. Again, such friction-induced breaks and tears result from the drag created on the uppermost side of the tortillas as they move beneath and contact the stationary plate. Such drag creates resistance which generally results in tears and breaks in the tortillas. If these tears and breaks sever the tortillas, then the severed portions may cause an obstruction or blockage within machine components. Consequently, it is often necessary to manually remove such obstructions and blockages which is both time-consuming and costly.

Fourth, the known machines typically require excessive ongoing maintenance, partly due to the aforementioned manual removal of obstructions or blockages. In addition, the Teflon coating on the stationary plate in the '632 machine requires frequent replacement. These and other maintenance related problems drastically reduce productivity and increase manufacturing costs.

Despite the numerous disadvantages with the known stacking, counting, and handling machines, including the machine in the '632 patent, they are still widely used in the food industry. Thus, while these machines may have some limited effectiveness in the manufacturing process of tortillas and other planar articles, they operate in a less than satisfactory manner.

Accordingly, an object of the present invention is to provide an apparatus for flexible, generally planar articles that consistently and uniformly stacks the articles.

It is another object of the present invention to provide an apparatus for stacking flexible, generally planar articles that reduces tears and breaks in the articles by eliminating friction between the articles and the various machine components.

It is another object of the present invention to provide an apparatus for stacking flexible, generally planar articles that eliminates unwanted folding in the articles.

It is another object of the present invention to provide an apparatus for stacking flexible, generally planar articles that prevents article-induced obstructions or blockages in the machine components.

It is another object of the present invention to provide an apparatus for stacking flexible, generally planar articles that moves imperfectly shaped or broken articles through machine components.

It is a further object of the present invention to provide an apparatus for stacking flexible, generally planar articles which may be incorporated into existing machines.

Other objects and advantages of the invention will appear hereinafter.

SUMMARY OF THE INVENTION

The present invention, in a preferred embodiment, accomplishes the foregoing objects by providing an apparatus for stacking a plurality of flexible, generally planar articles that comprises, in part, a series of interrelated conveyor belts, including a first, a second, and a third conveyor belt. The first conveyor belt extends along an upper, lower, first end, and second end surface of a belt support and is adapted to move the planar articles placed one the upper surface of the belt support from the first end to the second end. The second conveyor belt is biased against and inwardly deformed by the second end of the belt support for applying compressive and lateral forces to the planar articles as they are moved along the second end of the belt support. The third conveyor belt is located beneath the first and second conveyor belts for receiving planar articles discharged from the lower surface of the belt support. Power means movably drive the conveyor belts. A control system counts the number of tortillas passing a certain point, selects the number of tortillas to be stacked, and regulates the number of stacks discharged from the apparatus.

The first conveyor belt receives the planar articles which are placed on the upper surface of the belt support adjacent the first end. A vacuum source communicates with a plurality of air inlets dispersed over a portion of the belt support for maintaining the articles against the conveyor belt through vacuum force as they are carried along the upper surface, down the second end, and then beneath the belt support. Once beneath the belt support, the articles are dropped onto the third conveyor belt.

The second conveyor belt is biased against and inwardly deformed by the second end of the first conveyor belt. At the second end of the belt support, the second belt moves synchronously with the first belt (i.e., in the same direction and at the same speed). Thus, the second belt movingly and forcibly engages the articles as they move along the second end of the belt support.

The second conveyor belt is mounted on first, second, and third rollers. The first roller is outwardly offset from and positioned above the second end of the belt support. The second roller is generally vertically aligned with the first roller and is substantially even or co-planar with the lower surface of the belt support. The third roller is inwardly offset from the second roller and is positioned beneath the lower surface of the belt support. A motor is connected by a gear assembly to the first roller for movably driving the second conveyor belt.

The third conveyor belt is positioned beneath the first and second conveyor belts for receiving and discharging planar articles dropped from the first conveyor belt and forming stacks of them.

In the preferred embodiment, three or four separate lines of tortillas are simultaneously carried along the first belt and then dropped onto the third belt to form three or four stacks of tortillas suitable for discharge.

Thus, the invention provides for an apparatus for stacking a plurality of flexible, generally planar articles. The inventive apparatus consistently and uniformly stacks the articles, reduces tears, breaks, and unwanted folding in the articles, and eliminates obstructions or blockages in machine components. Moreover, the inventive apparatus moves imperfectly shaped or broken articles through the machine components.

The above, as well as other objects and advantages of the invention, will become apparent from the following detailed description of the preferred embodiments, reference being made to the accompanying drawings.

DETAILED DESCRIPTION OF THE INVENTION

Figure 1:
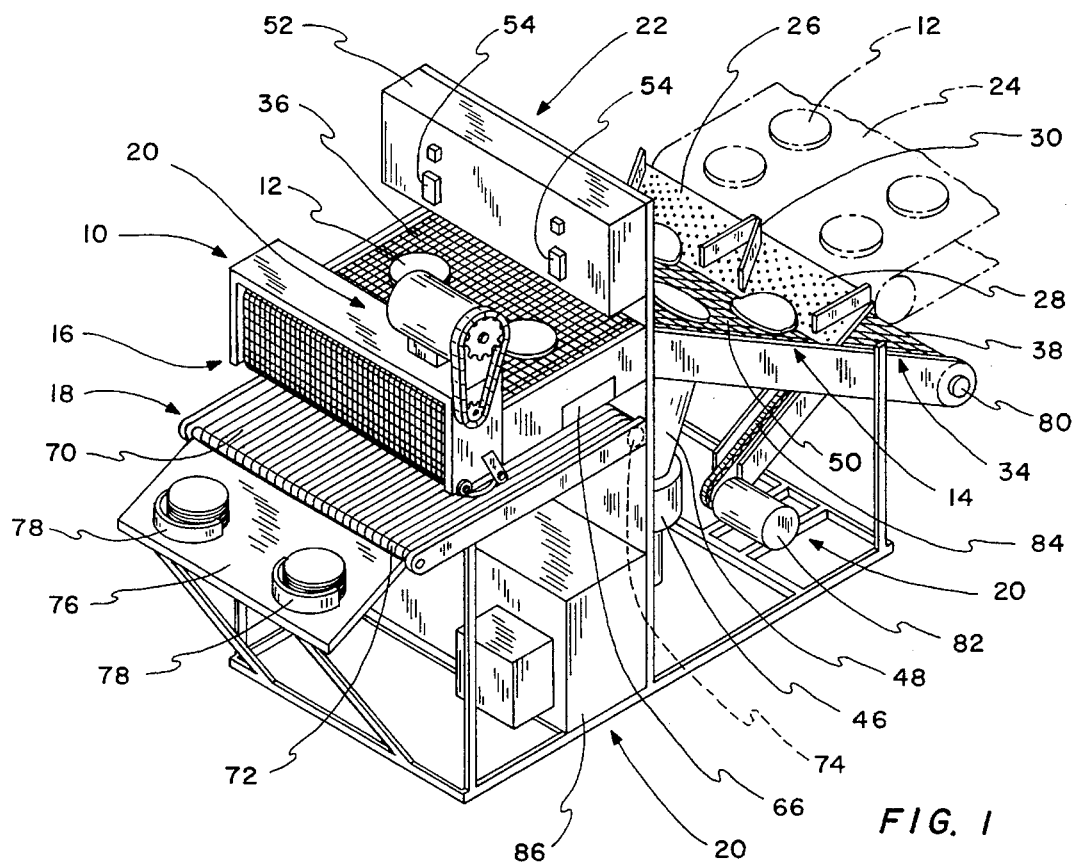
FIG. 1 is a perspective view of the inventive counting and stacking apparatus.

Generally referring to FIG. 1, the invention provides an apparatus, denoted by the numeral 10, for stacking a plurality of flexible, generally planar articles, such as tortillas 12. Apparatus 10 comprises, in part, a series of interrelated conveyor belts, including a first conveyor belt 14, a second conveyor belt 16, and a third conveyor belt 18. Power means 20 movably drive the belts, Whereas control means 22 count the number of tortillas passing a certain point, select the number of tortillas to be stacked, and regulate the number of stacks discharged from apparatus 10.

Figure 4:
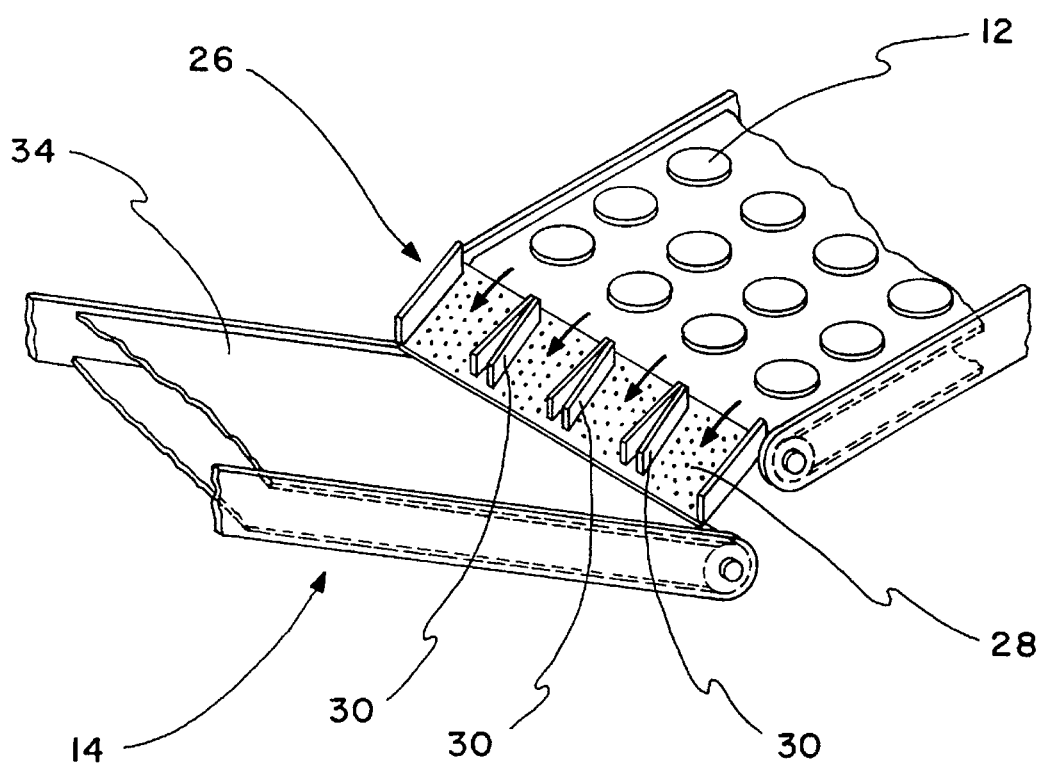
FIG. 4 is a partial perspective view of the apparatus of FIG. 1, illustrating the preferred embodiment of the entry chute.

Referring first to FIG. 1, tortillas 12 are delivered to first belt 14 of apparatus 10 by any suitable means such as, for example, an auxiliary conveyor belt 24. Specifically, tortillas 12 are moved from one end of auxiliary belt 24 to an inclined entry chute 26 at the opposite end. Entry chute 26 is interposed between and connects auxiliary belt 24 to first belt 14. Entry chute 26 includes a plurality of air inlets 28 on its upper surface which creates a cushion of air that allows tortillas 12 to slide down the chute. In addition, a plurality of aligning guides 30 are located on entry chute 26 for contacting and directing tortillas 12 as they slide down the inclined chute and onto first belt 14. The contact between aligning guides 30 and tortillas 12 establishes the desired linear position of the tortillas along the surface of first belt 14. In the preferred embodiment, entry chute 26 includes three or four aligning guides 30 so that numerous separate lines of tortillas 12 may simultaneously be processed by apparatus 10 (FIG. 4).

Figure 3:
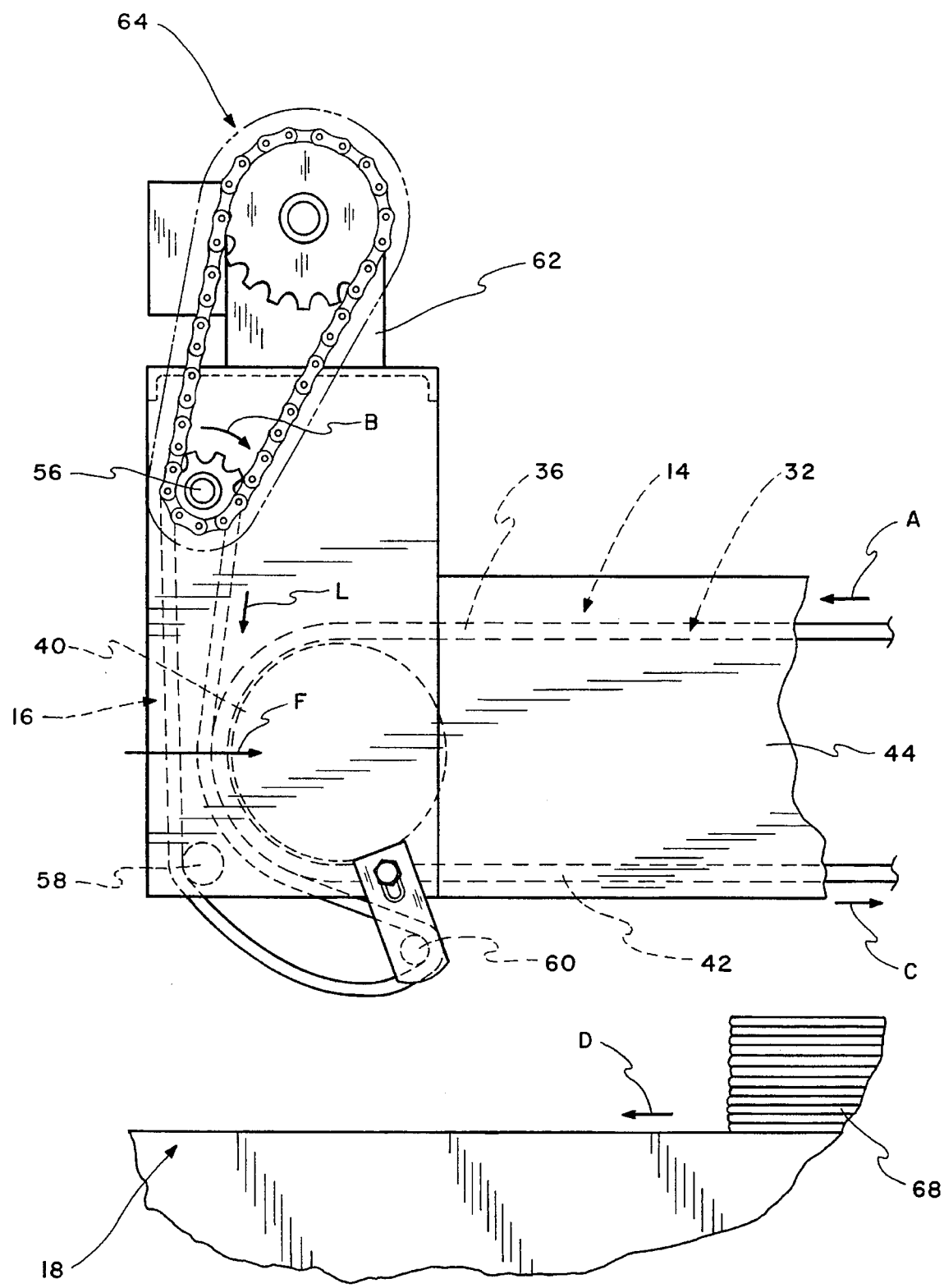
FIG. 3 is a side plan view of the belts of FIG. 2, illustrating the biased positioning of the second belt against the first belt.

First belt 14 is air permeable and is moved by a belt support 32 that includes an upper portion with an inclined section 34 and a horizontal section 36, a first end portion 38, a second end portion 40, and a bottom portion 42 (FIGS. 1, 3). The interior of belt support 32 forms an enclosed plenum 44 that is connected to a motor-driven exhaust fan 46 through a duct 48. In addition, a plurality of air inlets 50 are dispersed over inclined section 34, second end portion 40, and bottom portion 42 of belt support 32. Consequently, air drawn through first belt 14 into plenum 44 formed by belt support 32 forces tortillas 12 against first belt 14 by suction so that tortillas 12 rigidly adhere to first belt 14 as; they are moved up inclined section 34, down second end portion 40, and along bottom portion 42.

First belt 14 carries tortillas 12 from first end portion 38 and along inclined section 34 to a counting station or counter 52 which counts tortillas 12 as they pass beneath at least one electric eye or sensor 54 (FIG. 1). In addition, counting station 52 includes various electronic components which, in part, indicate when a predetermined number of tortillas have been stacked on the third conveyor belt (described subsequently) prior to their discharge, and also determines the number of stacks that have been discharged by apparatus 10.

Figure 2:
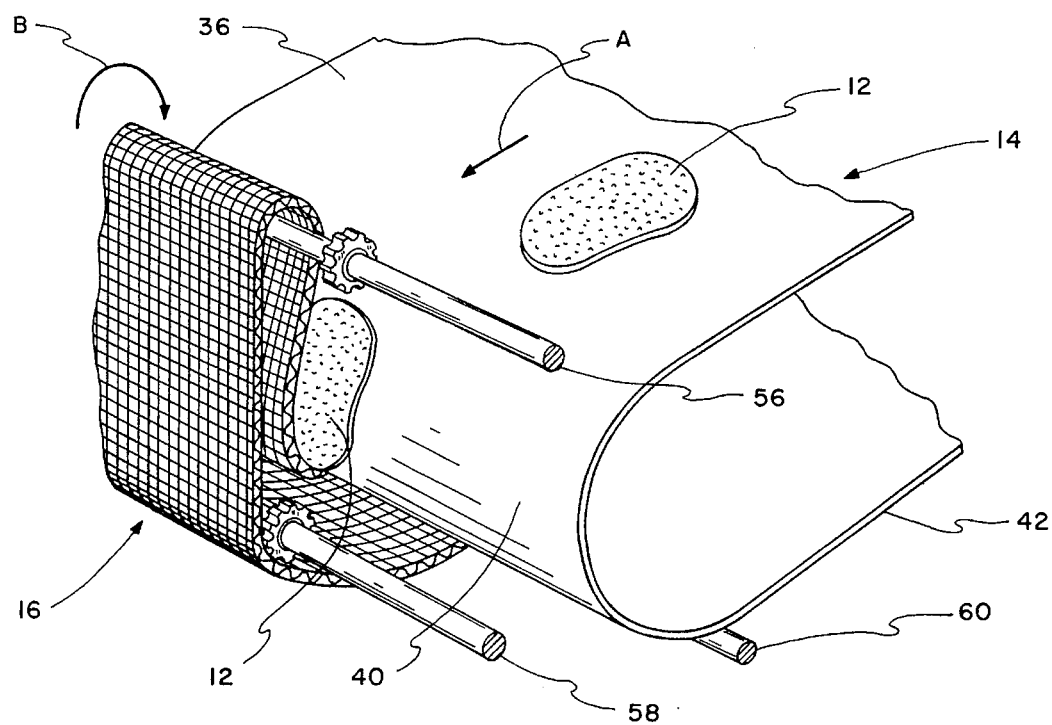
FIG. 2 is a partial perspective view of the first and second conveyor belts, illustrating the movement of tortillas between the two belts.

From counting station 52, tortillas 12 move along horizontal section 36 of belt support 32, in the direction indicated by arrow A (counter-clockwise), until they reach second end portion 40 (FIGS. 2, 3). As tortillas 12 move around and are carried down second end portion 40, they are forcibly contacted on their exposed upper surfaces by second belt 16 which is generally biased against second end portion 40 of first belt 14 (FIG. 3).

Second belt 16 is rotatably mounted on a first roller 56, a second roller 58, and a third roller 60 (FIG. 3). First roller 56 is outwardly offset from and positioned above second end portion 40 of belt support 32. Second roller 58 is generally vertically aligned with first roller 56 and is substantially vertically even with bottom portion 42 of belt support 32. Third roller 60 is inwardly offset from second roller 58 and is positioned beneath bottom portion 42 of belt support 32. A motor 62 is connected by a gear assembly 64 to first roller 56 for movably driving second belt 16.

The generally biased positioning of second belt 16 relative to first belt 14 causes second belt 16 between first and third rollers, 56 and 58, respectively, to be inwardly deformed by and substantially flush with second end portion 40 of belt support 32 (FIG.3). Thus, as tortillas 12 move around second end portion 40 of first belt 14, they come into forcible contact with second belt 16 as it moves in the direction indicated by arrow B (clockwise) (FIGS. 2, 3). The effect of such forcible contact on the tortillas by the two belts 14, 16 is twofold. First, such contact results in a compressive force F being exerted on tortillas 12 which flattens the tortillas as they move around second end portion 40 of first belt 14. Moreover, the combination of compressive force F and air inlets 50 reinforces the rigid adherence of tortillas to first belt 14. Second, tortillas 12 are subjected to a lateral force L from second belt 16 which push tortillas 12 along second end portion 40 of first belt 14 as the belts move. Force L generally corresponds to the direction in which the tortillas are to move around second end portion 40. Such lateral force not only moves intact tortillas through second end portion 40, but also moves broken tortillas around second end portion 40, prevents obstruction or blockage adjacent second end portion 40, and eliminates unwanted folding of tortillas 12.

At this point in the machine, first and second belts 14 and 16, respectively, move synchronously in the same direction (down) and at the same speed (FIGS. 2, 3).

After tortillas 12 pass by second end portion 40, they are carried along bottom portion 42 of belt support 32, in the direction indicated by arrow C, to a discharge point 66 (FIG. 1, At discharge point 66, air inlets 50 terminate and tortillas 12 are dropped from first belt 14 onto third belt 18 to form stacks 68. As tortillas 12 drop, they first contact an arcuate aligning member (not shown) which guides tortillas 12 onto a stationary rack (not shown) and ensures substantially vertical alignment of tortillas 12 during the stacking process. The stationary rack is formed by a plurality of parallel rods.

Third belt 18 is formed by a plurality of evenly spaced and parallel circular belts 70 which are positioned beneath the parallel rods of the stationary rack (FIG. 1). Circular belts 70 extend between rollers 72 and 74 and preferably engage an idler roller (not shown) which may be moved from a lowered position to a raised position. In the raised position, circular belts 70 are lifted above the upper surface of the stationary rack for moving the tortilla stacks 68 on the belt towards an exit ramp 76 for their discharge, as indicated by the arrow D (FIG. 3). Alternatively, the parallel rods of the stationary rack may be pivotally lowered beneath the lower surface of circular belts 70 for moving the tortilla stacks 68 along third belt 18.

Thus, as the tortilla stacks 68 are carried along third belt 18, at least one semi-cylindrical bin 78 is mounted on exit ramp 76 for receiving and preserving the tortilla stacks (FIG. 1). The tortilla stacks are then manually removed and packaged.

The powered components for driving belts 14, 16, and 18 are conventional motors and related assemblies (FIGS. 1, 3). For example, first belt 14 is moved by a roller 80 that is connected to a motor 82 through a belt 84. Second belt 16 is moved by first roller 56 which is connected to motor 62 by gear assembly 64. Likewise, third belt 18 is moved and connected to a motor 86 through a belt (not shown).

The control system for counting, stacking, and discharging the tortillas includes a conventional optical sensor 54 which is powered by a conventional power supply (not shown). The sensor 54 generates a pulse each time a tortilla is detected at a certain point on apparatus 10, and this pulse is applied to counter 52 which also is powered by the same power supply. The counter 52 indicates the number of tortilla stacks 68 formed from apparatus 10 (FIG. 3). The control system further includes other mechanisms (not shown) which determine the number of tortillas to be stacked, and which regulate the number of stacks formed from apparatus 10.

Apparatus 10 has not been described in terms of approximate measurements, as it should be understood that the dimensions of the apparatus, including the length and width of the conveyor belts, may vary according to the size of the tortillas or other planar articles.

Therefore, it should be recognized that, while the invention has been described in relation to a preferred embodiment thereof, those skilled in the art may develop a wide variation of structural details without departing from the principles of the invention. Accordingly, the appended claims are to be construed to cover all equivalents falling within the scope and spirit of the invention.

The invention claimed is:

1. An apparatus for stacking a plurality of flexible, generally planar articles, said apparatus comprising:

a first belt support having a first end, an upper surface, a second end, and a lower surface;

a first conveyor belt extending along and defining a path around said first belt support, said first conveyor belt suitable for moving the planar articles placed on said first belt along said path from said first end to said second end;

a second belt support having first, second and third rollers, said first and second rollers being vertically aligned and outwardly offset from said second end of said first belt support, said third roller inwardly offset from said second end of said first belt support;

a second conveyor belt extending around said second belt support and biased against said first belt only adjacent said second end of said first belt support where the planar articles are in a substantially vertical position as they pass between said first and second belts;

a third conveyor belt for receiving said planar articles from said first conveyor belt after they pass between said first and second belts and for transporting the planar articles as desired; and power means for driving said first, second, and third conveyor belts.

2. The apparatus of claim 1 wherein said first and second belts move in the same direction and at the same speed at said second end of said belt support.

3. The apparatus of claim 1 further comprising an entry chute mounted adjacent said first end of said belt support, said entry chute including at least one alignment guide for linearly positioning said planar articles on said first conveyor belt.

4. The apparatus of claim 1 wherein said planar articles are discharged from said first belt at said lower surface of said belt support onto said third conveyor belt to form stacks.

5. The apparatus of claim 1 wherein said power means comprise a plurality of motors and assemblies connecting said motors to said first, second and third belts.

6. The apparatus of claim 1 further comprising a control system for counting said planar articles.

7. The apparatus of claim 1 wherein said second conveyor belt between said first and third rollers is deformed by and substantially flush with said first belt at said second end of said belt support.

8. The apparatus of claim 7 wherein said power means includes a motor and said first roller is connected by a gear assembly to the motor for driving said second conveyor belt.

9. An apparatus for stacking a plurality of flexible, generally planar articles, said apparatus comprising:
   a belt support having a first end, an upper surface, a second end, and a lower surface;
   a first, air permeable conveyor belt extending along and defining a path around said belt support, said first conveyor belt suitable for moving the planar articles along said path from said first end to said second end;
   a second conveyor belt biased against said first belt at said second end of said belt support only where the planar articles are in a substantially vertical position as they pass between said first and second belts;
   a third conveyor belt located beneath said first and second conveyor belts for receiving said planar articles from said first conveyor belt after they pass between said first and second belts;
   power means for driving said first, second, and third conveyor belts, said first, and second belts moving in the same direction and at about the same speed at said second end of said belt support;
   a vacuum source directed at said first conveyor belt; and
   a duct communicating with said vacuum source and a plurality of air inlets dispersed over said upper surface and at least a portion of said lower surface of said belt support, said vacuum source drawing air from around said first belt through said air inlets and duct to create a vacuum force holding said planar articles against said first belt both before and after said planar articles have passed between said first and second belts.

10. The apparatus of claim 9 further comprising an entry chute mounted adjacent said first end of said belt support, said entry chute including at least one alignment guide for positioning said planar articles linearly on said first conveyor belt.

11. The apparatus of claim 9 wherein said entry chute comprises three alignment guides.

12. An apparatus for stacking a plurality of flexible, generally planar articles, said apparatus comprising:
   a belt support having a first end, an upper surface, a second end, and a lower surface;
   a first conveyor belt extending along and defining a path around said belt support, said first conveyor belt suitable for moving the planar articles placed on said first belt along said path from said first end to said second end;
   a second conveyor belt biased against said first belt at said second end of said belt support only where the planar articles are in a substantially vertical position for applying sufficient forces to said planar articles to flatten them as they pass between said first and second belts;
   a third conveyor belt located beneath said first and second conveyor belts for receiving said planar articles from said first conveyor belt after they pass between said first and second belts;
   power means for driving said first, second, and third conveyor belts; and
   wherein said first belt is air permeable and wherein said apparatus further comprises a vacuum source directed at said first belt to create a vacuum force holding said planar articles against said first belt after said planar articles pass between said first and second belts until they are to be dropped on a determined location on said third belt.

13. The apparatus of claim 12 further comprising a duct communicating with said vacuum source and a plurality of air inlets dispersed over said upper surface, said second end, and at least a portion of said lower surface of said belt support.

14. An apparatus for stacking a plurality of tortillas, said apparatus comprising:
   a belt support having a first end, an upper surface, a second end, and a lower surface;
   a first air permeable conveyor belt extending along and defining a path around said belt support, said first conveyor belt suitable for moving the tortillas placed on said first belt along said path from said first end to said second end;
   a second conveyor belt biased against said first belt at said second end of said belt support only where the tortillas are in a substantially vertical position as they pass between said first and second belts;
   a vacuum source directed at said first belt for retaining said tortillas against said first belt while they pass between said first and second belts and for a predetermined distance thereafter;
   a third conveyor belt located beneath said first and second conveyor belts for receiving said tortillas from said first conveyor belt after they pass between said first and second belts and after they travel said predetermined distance;
   power means for driving said first, second, and third conveyor belts; and
   an entry chute mounted adjacent said first end of said belt support, said entry chute including three alignment guides for positioning said tortillas on said first conveyor belt.

* * * * *